T. J. DAVIS.
MILK CAN CONTAINER AND SERVER.
APPLICATION FILED MAR. 27, 1917.
Reissued Apr. 2, 1918.
14,456.
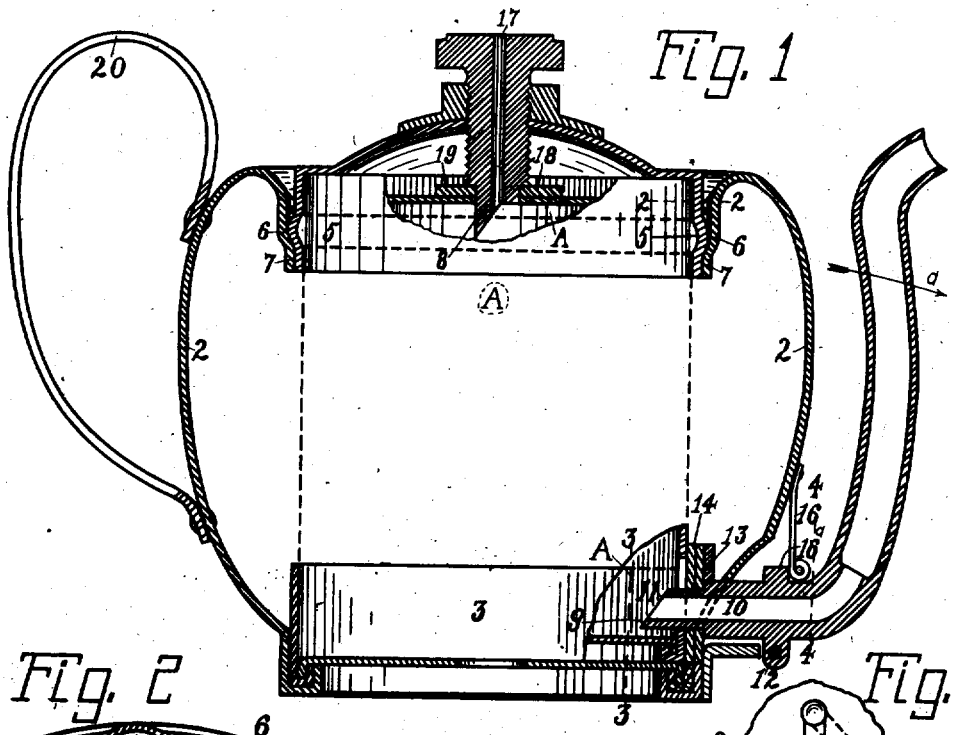
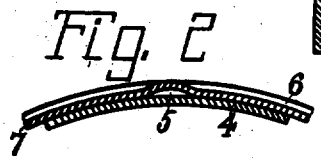
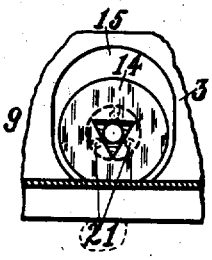
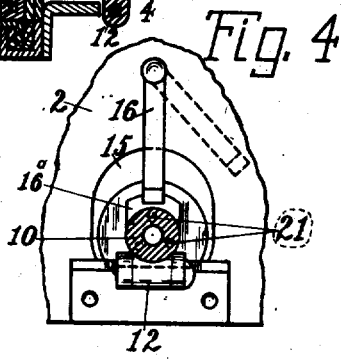
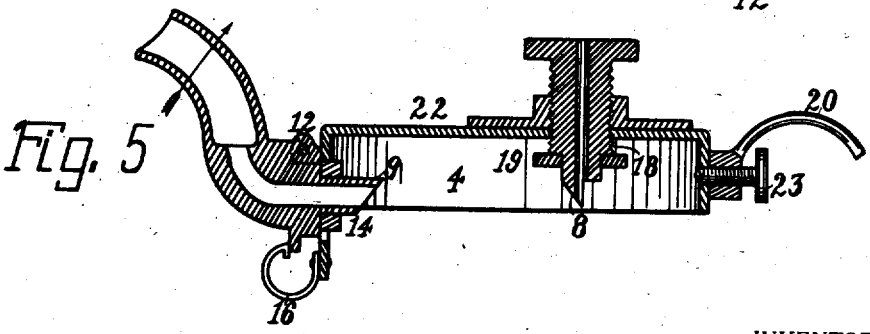
INVENTOR.
Thomas J. Davis.
BY
Carlos P. Griffin
ATTORNEY.

UNITED STATES PATENT OFFICE.

THOMAS J. DAVIS, OF SAN FRANCISCO, CALIFORNIA, ASSIGNOR TO LIQUID CONTAINER & SERVER CORPORATION, OF SAN FRANCISCO, CALIFORNIA, A CORPORATION OF CALIFORNIA.

MILK-CAN CONTAINER AND SERVER.

14,456. Specification of Reissued Letters Patent. Reissued Apr. 2, 1918.

Original No. 1,165,229, dated December 21, 1915, Serial No. 1,555, filed January 11, 1915. Application for reissue filed March 27, 1917. Serial No. 157,843.

*To all whom it may concern:*

Be it known that I, THOMAS J. DAVIS, a citizen of the United States, residing in the city and county of San Francisco, State of California, have invented a new and useful Improvement in Milk-Can Containers and Servers, of which the following is a specification in such clear and full terms as will enable those skilled in the art to construct and use the same.

This invention relates to a milk can container and server.

It is one of the objects of the present invention to provide an improved sanitary container for cans containing liquids, such as condensed milk, and the like; and to provide in said container novel means whereby discharge and vent openings can be readily punched in the can to facilitate the discharge of the milk.

A further object of my invention is to provide novel means for locking the can perforating member to the carrier, holder or receptacle for the can, and to provide means whereby a side wall of the can may be easily perforated thereby making it possible to more readily pour the liquid from the spout.

Another object of the invention is to make use of a gasket around the can perforating member whereby the liquid may be poured from the can without danger of leakage, the gasket fitting the curve of the side of the can more closely than the metal of the spout or can perforating member could.

Another object of the invention is to make it possible to perforate the can near the base thereby preventing the contents from spoiling so easily as is the case where this is not done.

Any liquid may be used in the can.

Further objects will hereinafter appear.

The invention consists of the parts and the construction and combination of parts as hereinafter more fully described and claimed, having reference to the accompanying drawings in which:—

Figure 1 is a central vertical section through the container,

Fig. 2 is a partial plan section on line 2—2, Fig. 1,

Fig. 3 is a partial vertical section on line 3—3, Fig. 1,

Fig. 4 is a similar section on line 4—4, Fig. 1,

Fig. 5 is a modification of the structure shown in Fig. 1.

A indicates a standard size and form of condensed milk can and 2 the container into which it is inserted. This container is designed to form any suitable exterior contour or shape desired, and is provided with a socket 3 in the bottom to hold the can in a central position thereon, and is, furthermore, provided with a removable cover 4. The cover may be secured in any suitable manner, but preferably as here shown by forming two or more projecting bosses 5 on the rim of the cover which are adapted to be brought into interlocking register with an annular bead 6 formed in the downturned rim 7 of the container.

The container is provided with two separate can perforating members 8 and 9, one serving as an air vent for the can while the other forms a pouring spout through which the milk is discharged. The lower perforating member 9 serving as the discharge is formed on the inner end of the spout, indicated at 10, and is preferably triangular in cross-section, as shown in Fig. 3, and cut on an angle, as at 11, to form a cutting point. The spout is pivotally mounted on the container, as at 12, and will in this manner form a lever by which perforating point 9 may be forced into the can. A shoulder 13 is formed on the spout, just behind the perforating point, and this forms a seat for a gasket 14 which in turn serves as a packing between the can and spout to prevent leakage at this point. One side of the socket member is cut out, as indicated at 15, to permit the perforating member to be swung into and out of engagement with the can, and a spring catch 16 is provided to lock the spout in upright position after the can is perforated.

The upper perforating member, forming the vent opening for the can, consists of a screw provided with a head on one end and a perforating point 8 on the other end. The screw is provided with a central vent opening 17, and is also shouldered, as at 18, to form a seat for a gasket 19, serving as a packing between the screw and the can top.

With the cover removed, the can is inserted and perforated in the following manner: Catch 16 is first released and the spout swung down in the direction of arrow a sufficiently far to bring the perforating point out of socket 3. The milk can is then inserted and the cover replaced. The venting member is then screwed down until gasket 19 firmly engages the top of the can; in this manner perforating the top of the can to form communication between the interior thereof and venting passage 17. The spout is next grasped and swung in an upward direction. This causes point 9 to perforate and enter the lower end of the can and at the same time brings gasket 14 into firm engagement with the can, thus forming a packing to prevent leakage between the spout and can. Catch 16 is next swung into locking engagement with a shoulder 16[a] formed on the spout to retain the parts in locked position. The device as a whole is now ready for use and may be lifted or tilted by suitable means, as the handle 20. Shoulders 19 and 13 are preferably provided with a plurality of small projecting points 21 which enter the body of the gasket a sufficient distance to always retain same in position or from accidentally falling off.

In Fig. 5 a modification is shown. The main body of the container is in this instance eliminated, a cover-like section 22 being employed in place thereof. This cover is placed on top of the can and is secured thereon by a clamp screw 23. The perforating members 8 and 9, carried by the cover, are operated and constructed similar to the perforating members described in connection with Fig. 1, the only difference being a change in position.

A container constructed as here shown is simple and substantial and is easily operated, as the perforating members are inserted either by lever or screw action.

The different parts of the device are such as the experience and judgment of the manufacturer may dictate and are so arranged that they may be easily cleaned from time to time, thereby producing a perfectly sanitary device from which milk or the like may be dispensed.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is:—

1. In a device of the type set forth, a member adapted to engage the bottom of a can and having a circumferential wall adapted to engage the can sides, said wall having a horizontal opening therein, a perforating member pivoted to said wall and being adapted to enter said opening and having a spout which extends up from the bottom of said member and along the side of the wall thereof, said perforating member having a projection located above its pivotal point, and a catch connected to said wall and engageable with said projection.

2. In a device of the type set forth, a container formed to receive a can and having a horizontal opening formed in a vertical wall thereof adjacent the container bottom, a perforating member pivoted at its bottom to said wall and adapted to be received in said opening and having a spout which latter extends up from the container bottom and along the side of the container, a vertical shoulder on said member, a gasket abutting the shoulder and adapted to engage said vertical container wall in surrounding relation to said opening thereof, a shoulder on said member extending upwardly therefrom, and a catch on the vertical container wall adapted to engage the last-named shoulder and located between the spout and said wall.

3. In a device of the type set forth, a member adapted to engage an end of a can and having a vertical wall to engage the can sides, said wall having an opening, a perforating member receivable in said opening and having a spout disposed along the side of the wall and having a vertical portion adapted to abut said wall in surrounding relation to the opening, means to pivotally connect the member to said wall, and means on the side wall to latch the member to hold said vertical portion in abutting engagement with the wall.

4. The combination with a receptacle holder on which a can may be placed of a perforating member pivoted to the holder to perforate a can or receptacle adjacent the bottom thereof, a spout extending from the perforating member toward the top of the receptacle alongside the same, and means to lock the perforating member to the holder.

5. The combination with a can holder upon which a can is adapted to be placed, of a perforating member hinged thereto and adapted to perforate a side wall of the can adjacent the bottom thereof, a spout carried by the perforating member and extending upwardly alongside the can, means on the holder to coöperate with means on the side for locking the spout in a fixed position with respect to the holder when the can has been perforated.

6. The combination with a can holder upon which a can is adapted to be placed, of a perforating member hinged thereto near the base thereof, a spout carried by the perforating member, and means on the holder to coöperate with means on the spout for locking the latter in a position alongside of the can, the opening into said can being adjacent the bottom thereof.

In testimony whereof I have hereunto set my hand this 21st day of March, 1917.

THOMAS J. DAVIS.